United States Patent
Nozawa (10) Patent No.: US 7,430,325 B2
(45) Date of Patent: Sep. 30, 2008

(54) ENCODING SYSTEM CONVERSION APPARATUS AND METHOD FOR SAME

(75) Inventor: Shingo Nozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 879 days.

(21) Appl. No.: 10/639,868

(22) Filed: Aug. 13, 2003

(65) Prior Publication Data

US 2004/0042550 A1 Mar. 4, 2004

(30) Foreign Application Priority Data

Aug. 29, 2002 (JP) ............................. 2002-251710

(51) Int. Cl.
*H04N 7/12* (2006.01)

(52) U.S. Cl. ............ 382/232; 375/240.12; 375/E71.98; 386/E90.13

(58) Field of Classification Search ................. 382/232; 725/55, 39, 61; 375/240.12
See application file for complete search history.

(56) References Cited

U.S. PATENT DOCUMENTS

| | | | | |
|---|---|---|---|---|
| 5,953,456 | A * | 9/1999 | Ikeda et al. | 382/232 |
| 5,963,678 | A * | 10/1999 | Nozawa | 382/299 |
| 6,360,018 | B1 * | 3/2002 | Nozawa | 382/248 |
| 6,587,505 | B1 * | 7/2003 | Nozawa et al. | 375/240 |
| 2002/0092021 | A1 * | 7/2002 | Yap et al. | 725/55 |

* cited by examiner

*Primary Examiner*—Samir A. Ahmed
*Assistant Examiner*—Stephen R Koziol
(74) *Attorney, Agent, or Firm*—Fitzpatrick, Cella, Harper & Scinto (57) ABSTRACT

An encoding system conversion apparatus includes an encoding parameter prediction unit, which analyzes a first encoded image data encoded by a first encoding system that is intermittently read from a recording medium, and which predicts an encoding parameter for encoding with a second encoding system that is different from the first encoding system. The system also includes a conversion unit that converts the first encoded image data read out continuously from the recording medium to a second encoded image data by the second encoding system, based on the encoding parameter predicted by the encoding parameter prediction unit.

20 Claims, 8 Drawing Sheets

ENCODING SYSTEM CONVERSION APPARATUS AND METHOD FOR SAME

BACKGROUND OF THE INVENTION

1. Field of the Invention

The invention relates to an encoding system conversion apparatus and a method for encoding system conversion, which converts video data of an arbitrary encoding system to video data of a different encoding system.

2. Description of Related Art

Advancements in recent years in digital signal processing technology have made it possible to perform highly efficient encoding of large amounts of digital information, such as digital data of moving images, still images, and audio. Applying such technology, development is underway of imaging apparatuses enabling the easy capture of high-quality images and quick output of the images to a recording medium.

At present, in many moving image capturing devices, a magnetic tape recording medium is used to record the encoded image data. The performance of read-write CDs (Compact Discs) and the like which are capable of reading and writing encoded image data is improving, and rapid development of imaging equipment using disk recording media.

Although a disk recording medium has better random access than tape recording medium, it has much smaller storage capacity than tape recording media. For this reason, imaging equipment using a disk recording medium generally uses an encoding system that has a better compression ratio than those used in imaging equipment using tape media.

Given the above-noted situation, in order to store encoded image data that is stored on a tape recording medium onto a disk recording medium, there is a need, not merely to copy the encoded image data, but to convert the encoded image data to an encoding system having a better compression ratio. To achieve this conversion from an encoding system with a low compression ratio to an encoding system with a higher compression ratio, an encoding system conversion apparatus is used.

Figure 1:
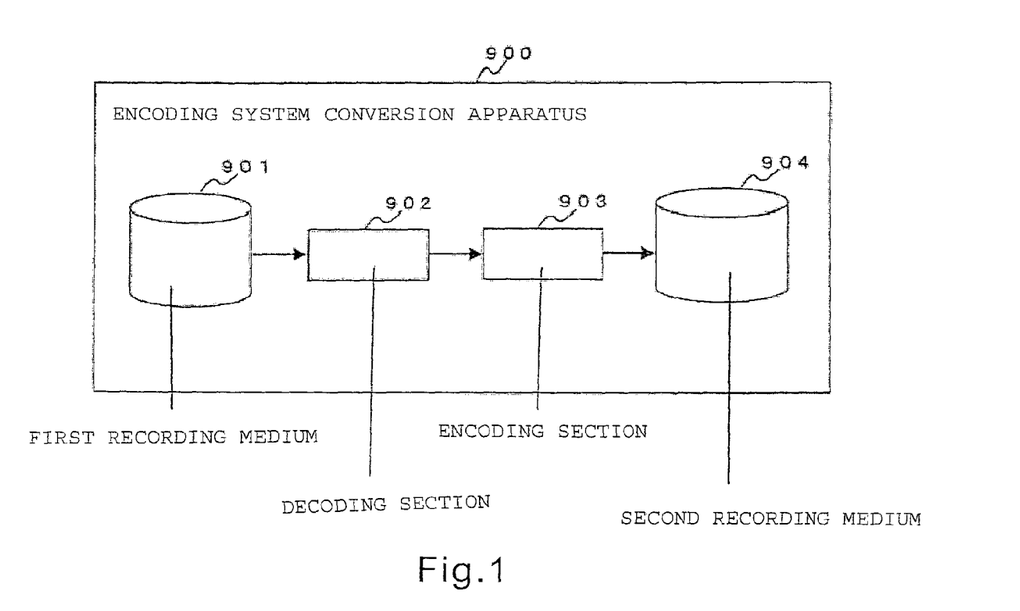
FIG. 1 is a block diagram showing the general configuration of a conventional encoding system conversion apparatus.

FIG. 1 of the accompanying drawings is a general block diagram of an encoding system conversion apparatus of the past.

The encoding system conversion apparatus 900 shown in FIG. 1 has a function of converting a first encoded image data encoded in a first encoding system to a second encoded image data encoded in a second encoding system.

The first recording medium 901 shown in FIG. 1 stores the first encoded image data encoded by the first encoding system. The decoding section 902 decodes the first encoded image data encoded in the first encoding system to obtain an image signal and outputs the resulting image signal. The decoding section 903 encodes the image signal decoded by the decoding section 902 by the second encoding system and generates the second encoded image data. The second recording medium 904 records the second encoded image data generated by the decoding section 903.

The first recording medium 901 is a tape recording medium and the first encoding system is an encoding system using intra-frame encoding only. The second recording medium is a disk recording medium and the second encoding system is an encoding system using inter-frame encoding. In this system, the compression ratio of the second encoding system is greater than the compression ratio of the first encoding system.

The processing performed in the encoding system conversion apparatus configured as noted above is as follows.

First, the decoding section 902 reads out the first encoded image data encoded by the first encoding system from the first recording medium 901, decodes the encoded image data to a image signal, and outputs the decoded image signal to the encoding section 903. Next, the encoding section 903 encodes the image signal output by the decoding section 902 by the second encoding system, generates the encoded image data, and records the generated data onto the second recording medium 904.

By the above operations, the encoding system conversion apparatus 900 converts the first encoded image data stored on the recording medium 901 to the second encoded image data and stores the second encoded image data on the second recording medium 904.

In the above-described example, because after first decoding the already encoded image data to a image signal, a completely new encoding is performed using a different encoding system, there is the problem of a great deterioration in image quality at the time of conversion. There exists known technology to solve this problem by reducing the image quality deterioration by integrating the decoding section and the encoding section, and performing encoding by the second encoding system without completely decoding the first encoded image data.

The above-noted prior art, however, still had the problem of an insufficient effect in the case in which there is a great difference between the target second encoding system and the first encoding system. Additionally, there is a known method of making a number of trial encodings using the second encoding system, estimating the data amount distribution from the result of the first encoding, and performing re-encoding based on this result. Although this method is very effective in limiting image quality deterioration, it has the problem of requiring a very long processing time, because of the increase in the number of encodings.

SUMMARY OF THE INVENTION

Given the above-noted situation, the present invention seeks to provide an encoding system conversion apparatus and method which, in a relatively short processing time, efficiently converts the encoding system of encoded image data with a small amount of deterioration of the image quality.

One preferred aspect of the present invention that achieves the above has a encoding parameter prediction unit, which analyzes the first encoded image data encoded by the first encoding system, which is intermittently read from a recording medium. The encoding parameter prediction unit predicts encoding parameters for the purpose of encoding with a second encoding system that is different from the first encoding system. A conversion unit is provided, which converts the first encoded image data read out continuously from the recording medium to the second encoded image data by the second encoding system, based on the encoding parameters predicted by the encoding parameter prediction unit.

Another preferred aspect of the present invention is a method for encoding system conversion. The method includes an encoding parameter predicting step of analyzing the first encoded image data encoded by the first encoding system, which is intermittently read from a recording medium, and predicting encoding parameters for the purpose of encoding with a second encoding system that is different from the first encoding system. The method also includes a converting step of converting the first encoded image data read out continuously from the recording medium to the second encoded image data by the second encoding system, based on the encoding parameters predicted by the encoding parameter predicting step.

Other features and advantages of the present invention will become apparent from the following detailed description, taken in conjunction with the accompanying drawings.

DETAILED DESCRIPTION OF THE PREFERRED EMBODIMENTS

Embodiments of the present invention are described below in detail, with references made to relevant accompanying drawings.

Figure 2:
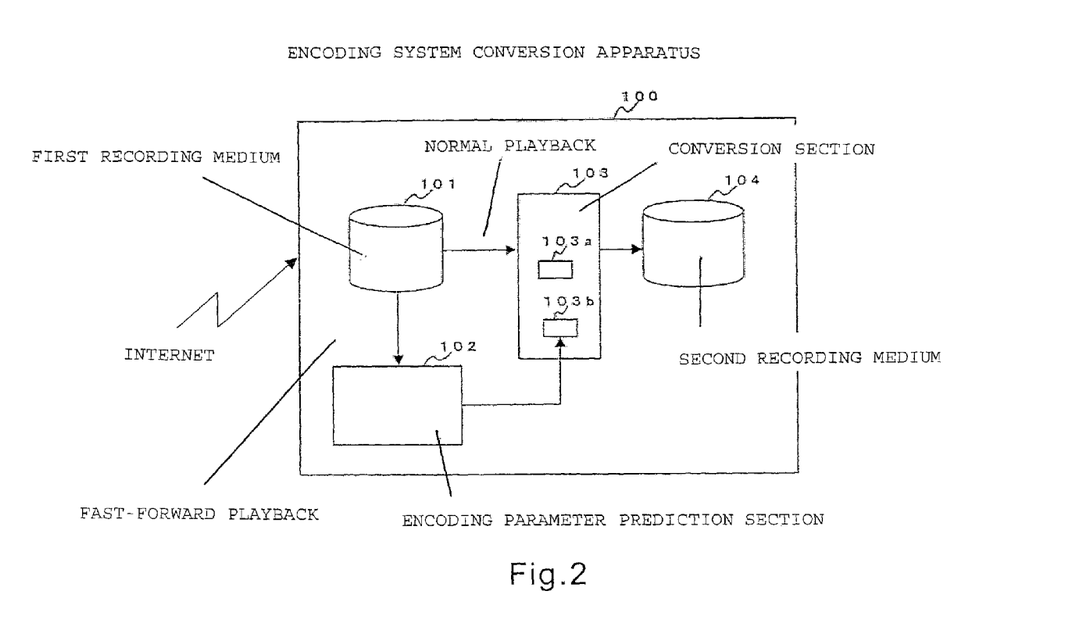
FIG. 2 is a block diagram showing the configuration of an encoding system conversion apparatus according to a first embodiment of the present invention.

FIG. 2 is a block diagram showing the configuration of an encoding system conversion apparatus according to the first embodiment of the present invention. The encoding system conversion apparatus 100 shown in this drawing has a function of converting a first encoded image data created by encoding a moving image signal of a moving image by a first encoding system to a second encoded image data encoded by a second encoding system.

The first recording medium 101 shown in FIG. 1 records the first encoded image data created by encoding a moving image signal by a first encoding system.

The first encoded image data recorded on the first recording medium 101 is encoded image data input via the Internet, or image data captured by a digital video camera, encoded by the first encoding system, and recorded on the first recording medium 101.

The first encoding system and the second encoding system are encoding systems for the purpose of compressing a moving image signal.

The encoding parameter prediction section 102 predicts encoding parameters for encoding by the second encoding system, by fast-forward playback of the first encoded image data and analysis of the attributes, such as image complexity, the amount of change in scenes, and the recording time of the first encoded image data.

The term fast-forward playback as used herein refers to processing of reading out in parts the first encoded image data from the first recording medium 101. By doing this, it is possible to complete the playback in a shorter time than the actual recording time of the first encoded image data.

The conversion section 103 decodes the first encoded image data played back normally from the first recording medium and uses encoding parameters predicted by the encoding parameter prediction section 102 to convert the decoded first encoded image data to the second encoded image data encoded by the second encoding system. The conversion section 103 has a decoding section 103a, which decodes the first encoded image data and outputs the resulting image signal, and an encoding section 103b, which encodes the image signal output from the decoding section 103a by the second encoding system and outputs the resulting second encoded image data. Details of the decoding section 103a and the encoding section 103b are presented later herein. The term "played back normally" as used above refers to the continuous reading out of the first encoded image data from the first recording medium 101.

The second recording medium 104 records the second encoded image data generated by the conversion section 103.

In this embodiment, the first recording medium 101 is a tape recording medium that can be mounted to and removed from the apparatus. The first encoding system is an intra-frame encoding system, such as the DVD encoding system or the motion JPEG encoding system or the like.

In general terms, intra-frame encoding is an entropy encoding system in which the image data of a single frame is divided into 8×8 pixel blocks, and in which a DCT (discrete cosine transform) is performed so as to perform quantization. In the DCT conversion processing, adaptive use is made of frame conversion processing and field conversion processing, depending upon image movement.

The second recording medium 104 is a disk recording medium that can be mounted to and removed from the apparatus. The second encoding system is an encoding system, such as the international standard MPEG1, 2, or 4, in which adaptive use is made of intra-frame encoding (intra-encoding) and inter-frame encoding (inter-encoding). The second encoding system is generally described as follows.

First, the correlation between images is determined, and selection is made of inter-encoding or intra-encoding, depending upon the results of this determination. If inter-encoding is selected, predicted error data, which is the difference data between an input image and a predicted image (image of a different frame) is subjected to a DCT conversion, quantized, and entropy-encoded. When intra-encoding is selected, however, rather than taking the difference relative to the predicted image, the input image is subjected to DCT conversion, quantized, and entropy-encoded.

It will be understood that the forms of the first recording medium 101 and the second recording medium 104 are not restricted to the above, and can be any form of computer-readable recording medium that can record encoded image data. The first and second recording media 101 and 104 can further be different regions on one and the same recording medium. Additionally, the first encoding system and the second encoding system are not limited to those described above, and can be various encoding systems for moving image data compression.

The processing operations of the encoding system conversion apparatus 100 will now be described.

Figure 3:
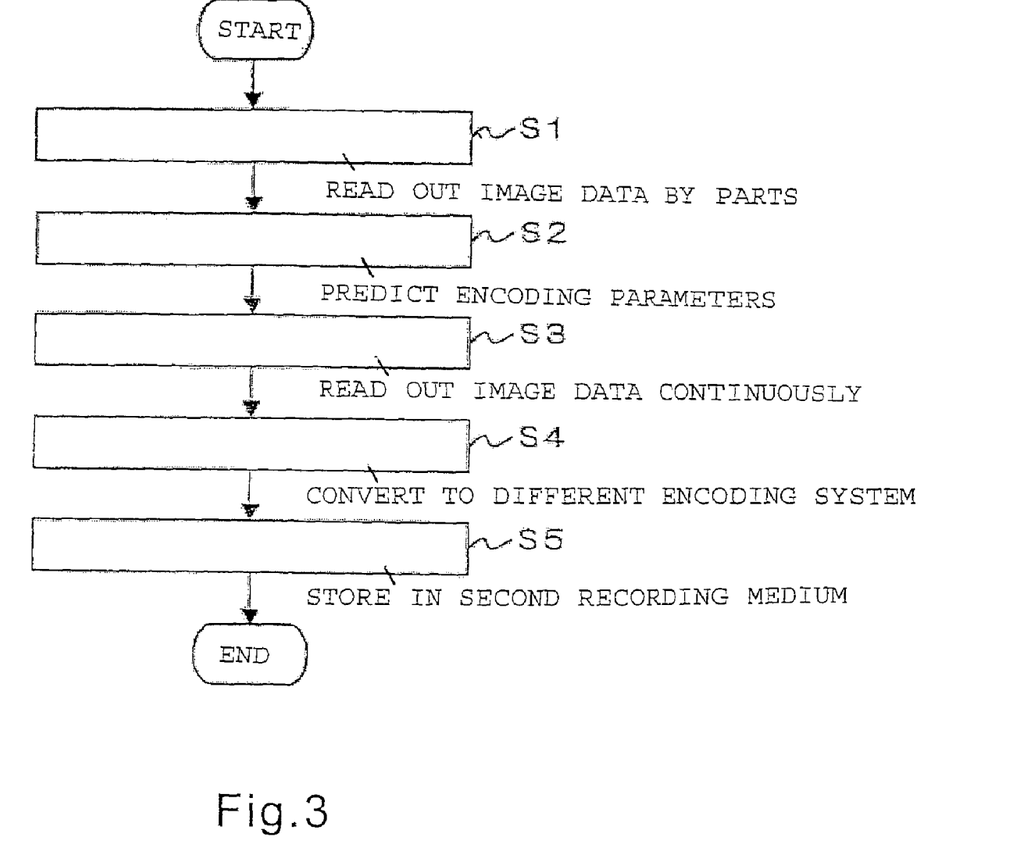
FIG. 3 is a flowchart showing the processing operations in the encoding system conversion apparatus shown in FIG. 2.

FIG. 3 is a flowchart showing the processing operations of the encoding system conversion apparatus 100 shown in FIG. 2.

As shown in FIG. 3, the encoding parameter prediction section 102 reads out in parts the first encoded image data recorded on the first recording medium 101 and performs fast-forward playback of the read-out data. Essentially, the first encoded image data stored on the first recording medium 101 is read out as a first encoded image data code stream, intermittently by recording tracks (step S1).

Next, the encoding parameter prediction section 102 analyzes the first encoded image data (hereinafter referred to as partial image data) read out in parts from the first recording medium 101, extracts attributes of the associated images (such as image complexity, the amount of change of scenes, and the recording time), and predicts encoding parameters for encoding by the second encoding system (step S2). Although the encoding parameter prediction section 102 decodes the partial data if necessary, there is no need to perform complete decoding. It is sufficient to perform decoding to the degree required to analyze the image attributes of the partial image data.

The processing by the encoding parameter prediction section 102 in predicting a encoding parameter is described below, using several specific examples.

First, the encoding parameter prediction section 102 analyzes the code stream of the partial image data and extracts various attributes of the image. For example, these attributes include the average value of the quantizing scale included in the partial image data code stream, the amount of data in each frame or in each block, the amount of high-frequency components in the discrete cosine transform coefficients, and the number of valid motion detection flags (amount of movement).

The partial image data, precisely because it is partially read-out image data, does not include the entire code stream. For this reason, although the encoding parameter prediction section 102 cannot perform analysis of all image frames and all image blocks, it is capable of sufficiently detecting the change in the general complexity of the image.

Consider some examples of the complexity of images detected by the encoding parameter prediction section 102.

Figure 4:
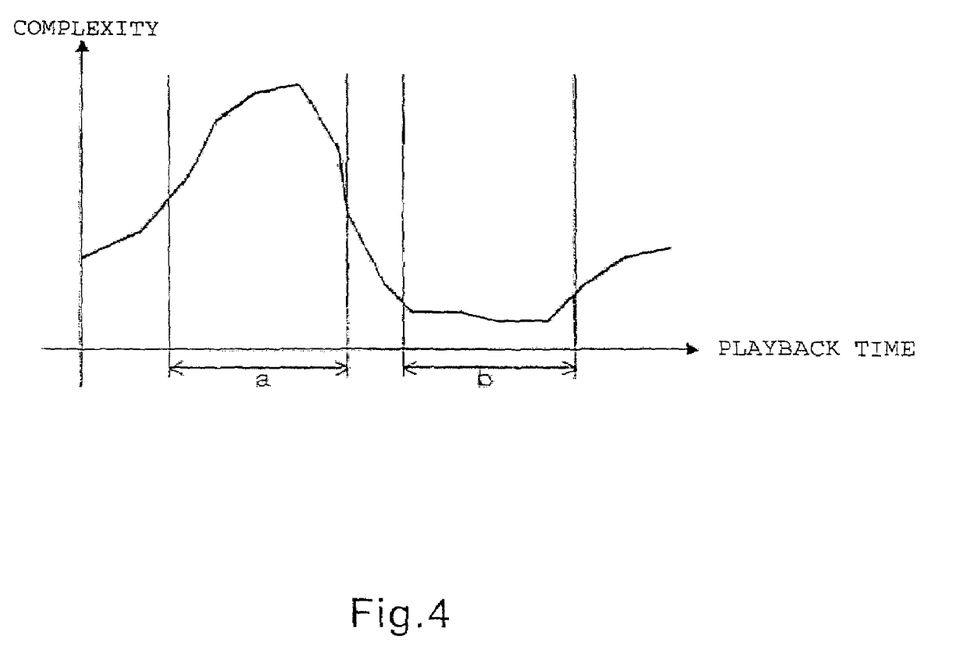
FIG. 4 is a graph showing an example of the image complexity detected by the encoding parameter prediction section shown in FIG. 2.

FIG. 4 is a graph showing some variations of the image complexity detected by the encoding parameter prediction section 102. In FIG. 4, the vertical axis represents image playback time, and the horizontal axis represents the complexity of the image.

As shown in this graph, the encoding parameter prediction section 102 detects that there is a high image complexity in the period a and a low image complexity in the period b. In such cases, the encoding parameter prediction section 102 predicts encoding parameters for the second encoding system so that the amount of data distributed into each image frame or each image block is large for the period a and small for the period b. For example, by performing encoding of a complex image with high resolution (large amount of data) and performing encoding of a non-complex image with a low resolution (small amount of data), it is possible to use encoding having an overall large compression ratio with a limited amount of deterioration of the overall image.

The control of the amount of data is performed by adjusting the quantizing scale. A method of calculating the encoding parameter (quantizing scale) is, for example, a method of providing a table beforehand which uniquely gives an encoding parameter from an index indicating the complexity of an image, and using the table to obtain the encoding parameter. Another method is one in which the encoding parameter is calculated from an index indicating the image complexity, using an prior established equation.

The encoding parameter prediction section 102 detects changes in scenes from the partial image data. Specifically, the encoding parameter prediction section 102 detects the change in scenes from a discontinuity in the time code included in the partial image data code stream, or from a position at which there is a large change in the average value of intensity within a frame. This is done because of the low correlation between frames at a scene change, and the extremely large deterioration that occurs with inter-frame encoding (inter-encoding) by the second encoding system. By doing this, at a scene change position, the encoding parameter prediction section 102 controls the encoding parameter of an image frame or an image block, thereby forcing the conversion section 103 to execute inter-frame encoding (inter-coding) with a small amount of image deterioration.

Essentially, the encoding parameters include an encoding switching control parameter for switching between inter-frame encoding (inter-coding) and intraframe encoding (intra-encoding).

The encoding parameter prediction section 102 also detects the recording time (or playback time) of the image from the partial image data. Specifically, it does fast-forward playback from the beginning of the first recording medium 101 (in the case of a tape recording medium), and takes the amount of time until an unrecorded part (the end of the recorded image) as the recording time. The encoding parameter prediction section 102 then calculates an appropriate encoding rate, based on the detected recording time and the remaining capacity on the second recording medium 104.

The encoding parameter prediction section 102 extracts the distribution of the image frame intensity and color distribution of the image frame, predicts an important region within the frame, and controls the encoding parameters. A region having a great distribution of skin tones, for example, is predicted by the encoding parameter prediction section 102 as being an important region having the image of a person, and the encoding parameter prediction section 102 accordingly sets the encoding parameters so as to make the amount of data distribution large. By doing this, it is possible for the conversion section 103 to perform encoding by the second encoding system without noticeable deterioration of the important image region.

As described above, the encoding parameter prediction section 102 extracts the attributes of the first encoded image data (for example, image complexity, frequency of scene changes, and recording time) from the partial image data, and predicts encoding parameters (such as data distribution amount, encoding system, and encoding rate) for encoding by the second encoding system. Doing this, the encoding parameter prediction section 102 holds the predicted encoding parameters and supplies them to conversion section 103.

Next, returning to the processing shown in FIG. 3, the conversion section 103 continuously reads out the first encoded image data stored on the first recording medium 101 (step S3). All of the code streams having the first encoded image data are read out and played back normally. Unless a dropout occurs in the playback signal, the conversion section 103 can read out the code stream of the first encoded image data at a speed that is higher than the normal playback speed (or recording speed).

As noted above, the conversion section 103 includes a decoding section 103a, which decodes the first encoded image data encoded by the first encoding system, and an encoding section 103b, which uses the encoding parameters in performing encoding by the second encoding system.

Next the decoding section 103a of the conversion section 103 decodes the first encoded image data (hereinafter referred to as the continuous image data) read out from the first recording medium 101. The encoding section 103b of the conversion section 103 based on encoding parameters supplied from the encoding parameter prediction section 102, encodes the continuous image data decoded by the decoding section 103*a* using the second encoding system (step S4).

The specific processing performed by the conversion section 103 at step S4 is as follows.

First, the encoding section 103*b* performs encoding so that the data amount distribution in a frame that includes a complex image is made large. By doing this, the conversion section 103 performs encoding of a complex image with a higher resolution. For example, by encoding a non-complex image with a low resolution, it is possible to perform image control so as to limit the overall amount of data. The encoding section 103*b* performs encoding of a part at which there is a scene change using intra-frame encoding (intra-encoding).

The encoding section 103*b* also performs encoding using an encoding rate that is included in the encoding parameters. By doing this, it is possible to perform encoding as appropriate to the image recording time and remaining amount of recording medium capacity, while reducing the amount of image deterioration. The encoding section 103*b* is supplied with the predicted values of encoding parameters from the encoding parameter prediction section 102, and the encoding section 103*b*, based on the supplied predicted values of encoding parameters, makes a final determination of the encoding parameters required for performing encoding by the second encoding system.

As described above, the conversion section 103 converts the first encoded image data to the second encoded image data encoded using the second encoding system, utilizing encoding parameters responsive to the second encoding system, which are read out by parts from the recording medium.

Next, the conversion section 103 stores the second encoded image data encoded by the second encoding system onto the second recording medium 104 (step S5).

With the recording of the second encoded image data, encoded by the second encoding system, onto the second recording medium 104, the processing is competed.

Because the first recording medium 101 is a tape recording medium, the encoding system conversion apparatus 100 has an interface and apparatus for the purpose of reading information from a tape recording medium. The encoding system conversion apparatus 100 also has a computer that is capable of accessing the second recording medium 104 and executing various programs.

As described above, the encoding system conversion apparatus 100 performs fast-forward playback of the first encoded image data encoded by the first encoding system from the first recording medium 101 (partial playback), so as to detect the attributes of the image and predict encoding parameters for the second encoding system which are responsive to the attributes, thereby enabling prediction of encoding parameters with high speed and sufficient accuracy. Because the encoding system conversion apparatus 100 uses the thus predicted encoding parameters in converting the first encoded image data to the second encoded image data encoded by the second encoding system, it is possible to obtain an image with little deterioration in image quality.

An encoding system conversion apparatus according to the second embodiment of the present invention is described below.

Figure 5:
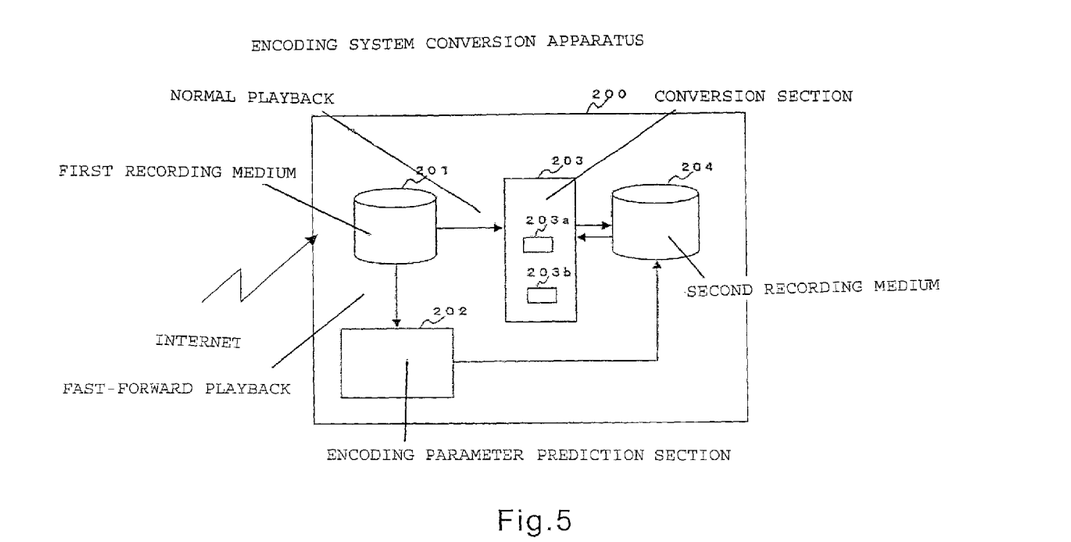
FIG. 5 is a block diagram showing the configuration of an encoding system conversion apparatus according to a second embodiment of the present invention.

FIG. 5 is a block diagram showing the configuration of an encoding system conversion apparatus 200 according to the second embodiment.

Although the encoding system conversion apparatus 200, similar to the encoding system conversion apparatus 100 shown in FIG. 2, has a function of converting a first encoded image data of a first encoding system to a second encoded image data of a second encoding system, it differs partially from the encoding system conversion apparatus 100 with respect to data processing.

The encoding system conversion apparatus 200 is described below, chiefly focusing on the part thereof that differs from the encoding system conversion apparatus 100.

The first recording medium 201, similar to the first recording medium 101, records a first encoded image data that has been encoded by the first encoding system.

The first encoded image data recorded on the first recording medium 201 is encoded image data input via the Internet, or image data captured by a digital video camera, encoded by the first encoding system, and recorded on the first recording medium 201.

The encoding parameter prediction section 202 has a function similar to that of the encoding parameter prediction section 102, except that the output destination of the encoding parameters is different (the second recording medium 204, described below). The conversion section 203 has a function similar to that of the conversion section 103, except that the location from which the encoding parameters are obtained is different (the second recording medium 204, described below). The conversion section 203 has a decoding section 203*a* and an encoding section 203*b*, the functions thereof being the same as the functions of the decoding section 103*a* and the encoding section 103*b* shown in FIG. 2.

The second recording medium 204, similar to the second recording medium 104 of FIG. 2, records the second image data encoded by the second encoding system, and further records the encoding parameters output by the encoding parameter prediction section 202.

The processing operations in the encoding system conversion apparatus 200 having the configuration shown in FIG. 5 are described below.

Figure 6:
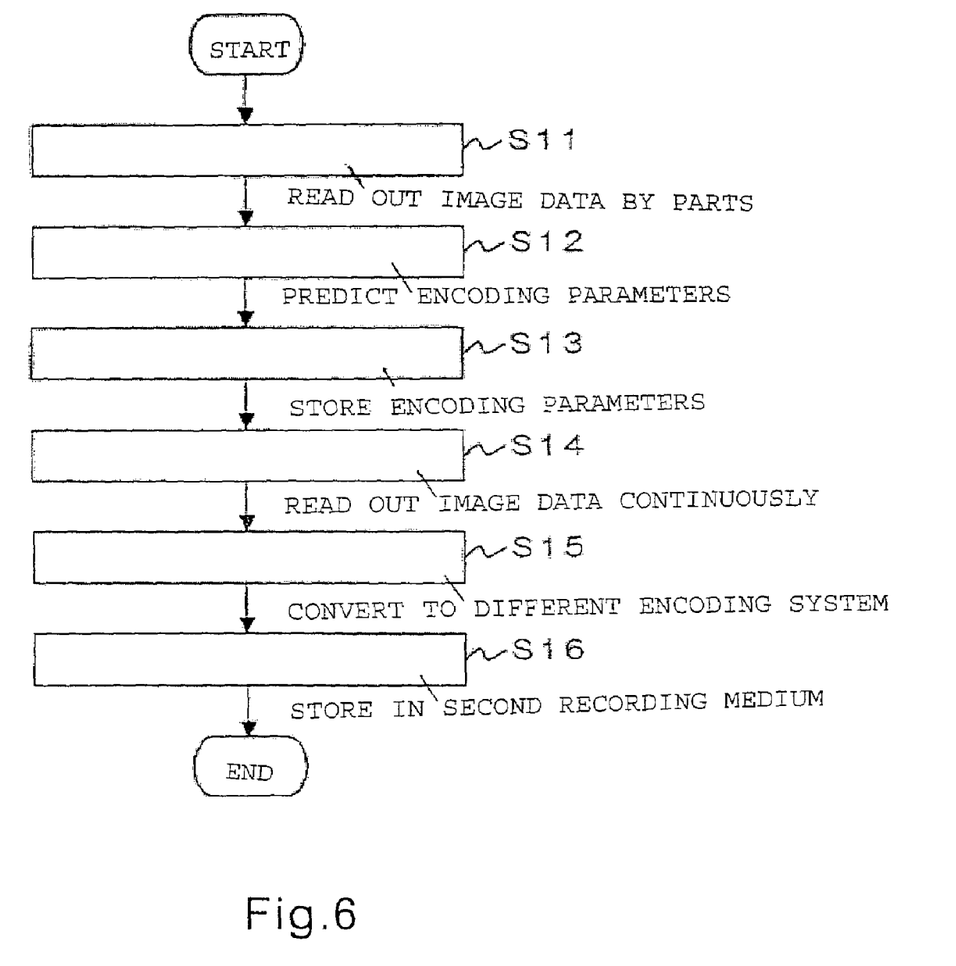
FIG. 6 is a flowchart showing the processing operations in the encoding system conversion apparatus shown in FIG. 5.

FIG. 6 is a flowchart showing the processing operations of the encoding system conversion apparatus 200. As shown in FIG. 6, first at step S11 the encoding parameter prediction section 202 reads out in parts the first encoded image data stored on the first recording medium 201, and performs fast-forward playback thereof. That is, in the case in which the first recording medium 201 is a tape recording medium, the first encoded image data stored on the first recording medium 201 is read out by parts as first encoded image data by recording tracks.

Next, at step S12, the encoding parameter prediction section 202 analyzes the first encoded image data that has been read out by parts and detects the image attributes (such as image complexity, the amount of change of scenes, and the recording time). The encoding parameter prediction section 202 then, based on these detected attributes, predicts encoding parameters for converting to the second encoding system.

Next, at step S13, the encoding parameter prediction section 202 stores the predicted encoding parameters on the second recording medium 204.

Following the above, at step S14 the decoding section 203*a* of the conversion section 203 performs continuous reading of the first encoded image data code stream stored on the first recording medium 201 and performs normal playback thereof. Thus, all of the code stream of the first encoded image data, which is to be converted is read out and played back. When this is done, as long there is no dropout of the playback signal (code stream of the first encoded image data), the reading out can be performed at a speed higher than the normal recording speed.

Next, at step S15 the decoding section 203*a* of the conversion section 203 decodes the code stream of the first encoded image data read from the first recording medium 201. The encoding section 203b of the conversion section 203 reads out the encoding parameters from the second recording medium 204 and, based on these encoding parameters, encodes the first encoded image data that was decoded by the decoding section 203a, using the second encoding system.

Next, at step S16, the conversion section 203 stores the second encoded image data encoded by the encoding section 203b by the second encoding system onto the second recording medium 204.

As described above, the encoding system conversion apparatus 200 predicts the encoding parameters for encoding using the second encoding system, based on the first encoded image data encoded by the first encoding system read out in parts from the first recording medium. These predicted encoding parameters are first stored onto the second recording medium 204, and the first encoded image data, having been continuously read out from the first recording medium, is converted to the second encoded image data by the second encoding system, based on the encoding parameters stored on the second recording medium.

The encoding parameters stored on the second recording medium 204 in the second embodiment are deleted therefrom at the completion of the conversion performed by the conversion section 203.

Figure 7:
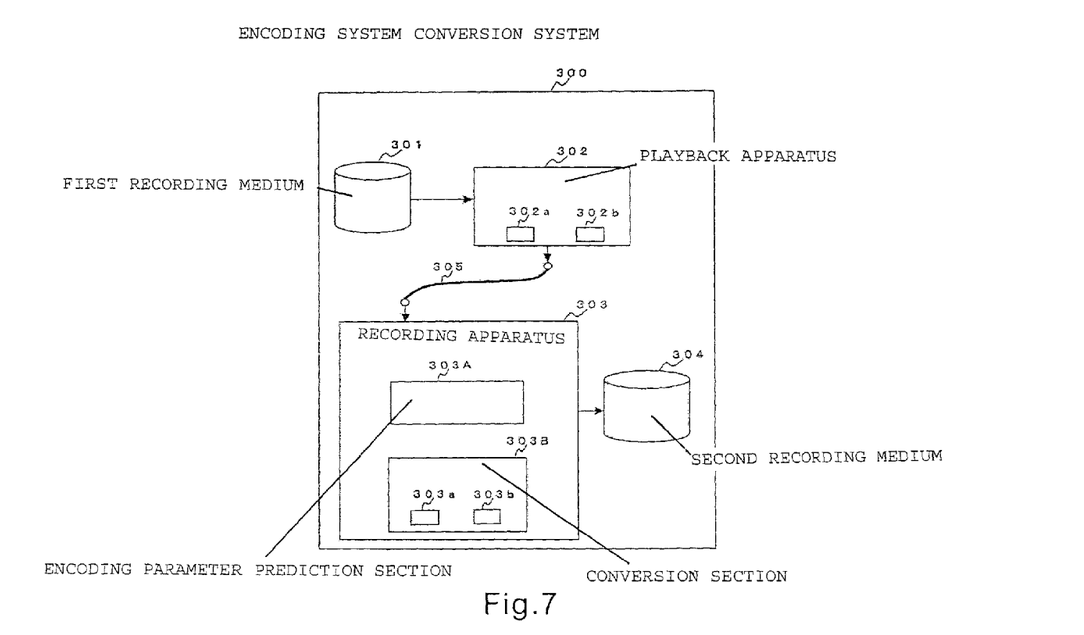
FIG. 7 is a block diagram showing the configuration of an encoding system conversion system according to a third embodiment of the present invention.

The third embodiment of the present invention is an encoding system conversion system, the configuration of which is shown in the block diagram form in FIG. 7.

The encoding system conversion system 300 shown in FIG. 7 has a function, similar to that of the encoding system conversion apparatus 100 shown in FIG. 1, of converting a first encoded image data of a first encoding system to a second encoded image data of a second encoding system. The encoding system conversion system 300 is described below, focusing on the parts thereof that differ from the encoding system conversion apparatus 100.

The first recording medium 301, similar to first recording medium 101 shown in FIG. 2, records a first encoded image data encoded by the first encoding system.

The first encoded image data recorded onto the first recording medium 301 is image data that is captured by a digital video camera, encoded by the first encoding system, and then recorded onto the first recording medium 301.

The playback apparatus 302 has a function of playing back from the first recording medium 301 the first encoded image data that is to be subjected to encoding system conversion, either by fast-forward playback or by normal playback. Specifically, the playback apparatus 302 has a fast-forward playback processing section 302a that performs fast-forward playback and a normal playback processing section 302b that performs normal playback.

The fast-forward playback processing section 302a reads out by parts, from the first recording medium 301, the first encoded image data to be subjected to encoding system conversion. The normal playback processing section 302b reads out, from the first recording medium 301, the first encoded image data to be subjected to encoding system conversion continuously, and performs normal playback thereof The recording apparatus 303 has a function of receiving, via a transmission path 305, a first encoded image data to be played back by the playback apparatus 302, and predicting encoding parameters based on the received first encoded image data. It additionally has a function of converting a code stream of the received first encoded image data, based on the predicted encoding parameters, to the second encoded image data, encoded by the second encoding system. Details of the configuration of the recording apparatus 303 are described later herein.

The second recording medium 304 records, in the same manner as the second recording medium 104 of FIG. 2, the second encoded image data encoded by the second encoding system. The transmission path 305 transmits, for example, the code stream of the first encoded image data and a control signal and the like for the purpose of controlling the playback apparatus 302 and the recording apparatus 303. The recording apparatus 303 further has a function of recording to the second recording medium 304 the code stream of the second encoded image data after conversion.

Details of the configuration of the recording apparatus 303 are as follows.

As shown in FIG. 7, the recording apparatus 303 has an encoding parameter prediction section 303A and a conversion section 303B. The encoding parameter prediction section 303A has a function similar to that of the encoding parameter prediction section 102 shown in FIG. 2. The conversion section 303B has a function similar to the conversion section 103 of FIG. 2, and has a decoding section 303a and an encoding section 303b. The decoding section 303a and the encoding section 303b have functions that are similar, respectively, to the decoding section 103a and the encoding section 103b of FIG. 2. Because the first recording medium 301 in this embodiment is a tape recording medium, the playback apparatus 302 has a fast-forward function and a rewind function to enable quick adjustment to a read-out position on the tape.

Each of the processing sections shown in FIG. 2, FIG. 5, and FIG. 7 can be implemented with dedicated hardware, and can alternatively be configured by a memory and a CPU. It is possible to implement the functions of each of the processing sections by storing into memory a program representing the functions of the various processing sections and executing the program. The above-noted memory can be a non-volatile memory such as a hard-disk apparatus, a magneto-optical disk apparatus, or a flash memory, and can further be a read-only recording medium such as a CD-ROM or the like, a volatile memory such as a RAM (random access memory), or a combination of these memory types which can be read from and written to by a computer.

The processing operations of the encoding system conversion system 300 shown in FIG. 7 are described below.

Figure 8:
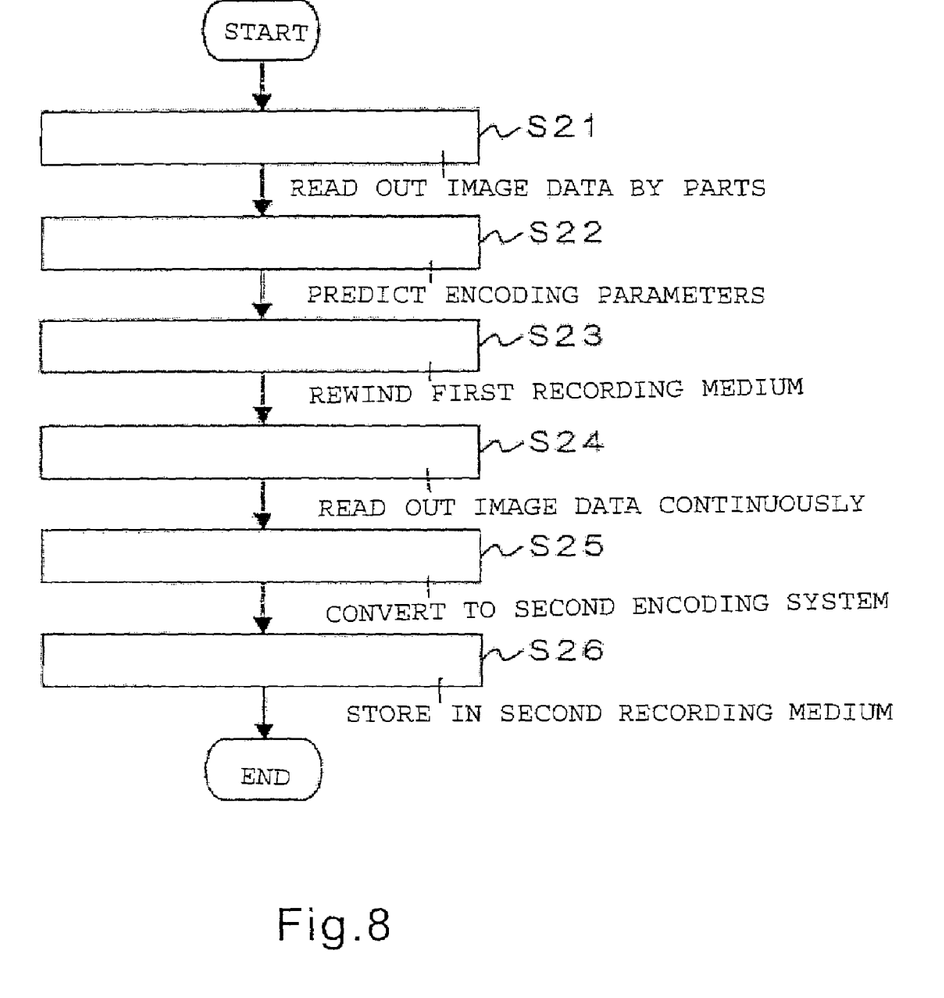
FIG. 8 is a flowchart showing the processing operations in the encoding system conversion system shown in FIG. 7.

FIG. 8 is a flowchart showing the processing operations of the encoding system conversion system 300 shown in FIG. 7.

First, at step S21 the fast-forward playback processing section 302a of the playback apparatus 302 reads in parts, from the first recording medium 301, the code stream of the first encoded image data encoded by the first encoding system, and performs fast-forward playback thereof. By doing this, a fast-forward playback signal (code stream of the first encoded image data read out in parts) is supplied to the recording apparatus 303 via the transmission path 305.

Next, at step S22 the recording apparatus 303 receives the fast-forward playback signal, analyzes the received code stream of the first encoded image data, and predicts encoding parameters corresponding to the second encoded image data.

Next, in the case in which the fast-forward playback is completed, at step S23 the playback apparatus 302 rewinds the first recording medium 301 to the beginning of the recording of the code stream of the first encoded image data, which is to be subjected to conversion. Note that this is for the case in which the first recording medium 301 is a tape recording medium, and that for a disk recording medium or a semiconductor memory or the like, an actual physical rewind does not occur. In the case in which the first recording medium 301 is a disk recording medium or a semiconductor memory or the like, the playback image is returned to the starting playback position in the recording medium.

After the above, at step S24 the normal playback processing section 302b of the playback apparatus continuously reads out the first encoded image data from the first recording medium 301, and performs normal playback thereof. The playback signal (code stream of the continuously read first encoded image data) is supplied, via the transmission path 305, to the recording apparatus 303.

Next, at step S25 the conversion section 303B of the recording apparatus 303 receives the playback signal and, based on the encoding parameters predicted by the encoding parameter prediction section 303A, performs conversion to the second encoded image data. The decoding section 303a decodes the playback signal so as to generate an image signal, and the encoding section 303b encodes this signal, based on the playback signal generated by the decoding section 303a, thereby forming the code stream of the second encoded image data.

Next, at step S26, the recording apparatus 303 stores the code stream of the converted second encoded image data into the second recording medium 304.

As described above, the encoding system conversion system 300 predicts encoding parameters based on the code stream of the first encoded image data read by parts from the first recording medium 301, and performs encoding by the second encoding system, based on the predicted encoding parameters of the first encoded image data, which was read continuously from the first recording medium 301.

The processing flow in the above-described system is controlled by one or both of the playback apparatus 302 and the recording apparatus 303. Control signals are exchanged between these two apparatuses, via the transmission path 305.

According to the foregoing embodiment, a plurality of apparatuses are combined to detect image attributes by performing fast-forward playback (playback by parts) of the first encoded image data from the first recording medium, to predict encoding parameters for the second encoding system based on the detected attributes, and to convert the first encoded image data read continuously from the first recording medium to the second encoded image data, based on the encoding parameters.

As indicated above, it is possible to apply the present invention either to a system such as an encoding system conversion system that is configured from a plurality of apparatuses (for example, a host computer, an interface apparatus, and a recording apparatus or the like), or to a single apparatus such as an encoding system conversion apparatus.

While in the various embodiments described above the first recording medium is a tape recording medium and the second recording medium is a disk recording medium, it will be understood that the present invention is not restricted in this manner, it being possible to apply the present invention in the case in which both the recording media are either tape recording media or disk recording media, or the case in which the first recording medium is a disk recording medium and the second recording medium is a tape recording medium. Additionally, although in the foregoing embodiments the first encoding system was one having only intra-frame encoding and the second encoding system was one having inter-frame encoding, it will be understood that the present invention is not restricted in this manner. It is possible to apply the present invention to the case in which both encoding systems are either intra-frame encoding or inter-frame encoding, and further possible to apply the present invention to the case in which the encoding systems are other types of encoding.

An aspect of the present invention is achieved not only by the foregoing embodiments, but also by a storage medium (or recording medium) into which is stored a program implementing the functions of the foregoing embodiments, this program being supplied to a CPU of a system or apparatus, which reads outs and executes the program stored in the storage medium. In this case, it is the program read out from the storage medium itself that implements the functions of the foregoing embodiments, and the storage medium into which the program is stored achieves the object of the present invention. The present invention encompasses a case in which an operating system or the like running on a computer performs part or all of the processing, based on instructions read by the computer, this processing implementing the functions of the foregoing embodiments.

The present invention additionally encompasses a case in which, after a program read from the storage medium is written into the memory of a functional extension card inserted into or a functional extension unit connected to a computer, a CPU on the functional extension card or functional extension unit executes part or all of the actual processing, thereby implementing the functions of the foregoing embodiments.

The present invention further encompasses a case in which the above-noted program is stored in a computer-readable storage medium, and the program is read from the storage medium and executed by a computer system to perform the various processing. In this case, the term computer system shall be understood to encompass an operating system and hardware peripherals and the like.

The above-noted program can further be transferred from a computer system stored in a recording apparatus to another computer system, via a transmission medium, or via a wireless signal over a transmission medium. In this case, the transmission medium that transmits the program is a medium having a function of transmitting information, such as a communication network like the Internet, or a communication circuit (communication line) such as a telephone circuit.

The above-noted program can be a program that implements a part of the above-described functions. Additionally, the program can be implemented by a combination of programs previously stored in a computer system, in the form of a difference file (difference program).

Stated differently, the foregoing description of embodiments has been given for illustrative purposes only, and shall not be construed as imposing any limitation.

The scope of the present invention is, therefore, to be understood solely by the following claims, and not to be limited by the language of the specifications, and any alterations made within the scope that are equivalent to the scope of the claims and that fall within the true spirit and scope of the present invention.

What is claimed is:

1. An encoding system conversion apparatus comprising:
   a fast playback unit, adapted to discontinuously read image data from a recording medium;
   a normal playback unit, adapted to continuously read image data from the recording medium;
   an encoding parameter prediction unit, adapted to analyze intermittent image data of first encoded image data encoded by a first encoding system that is discontinuously read from the recording medium by said fast playback unit, and predict an encoding parameter controlling an amount of data distribution for each image frame or each image block in encoding by a second encoding system that is different from the first encoding system; and a conversion unit, adapted to convert the first encoded image data read out continuously from the recording medium by said normal playback unit to second encoded image data by the second encoding system, based on the encoding parameter predicted by said encoding parameter prediction unit, wherein said conversion unit comprises a decoding unit, adapted to decode the first encoded image data read out continuously from the recording medium by said normal playback unit, and an encoding unit, adapted to encode, based on the encoding parameter predicted by said encoding parameter prediction unit, the first encoded image data decoded by said decoding unit with the second encoding system, and output the second encoded image data, and wherein said encoding parameter prediction unit detects an attribute of an image from the first encoded image data read out in parts from the recording medium, and predicts an encoding parameter for encoding by the second encoding system, responsive to a detection result.

2. The apparatus according to claim 1, wherein the second encoding system encodes by units of image blocks.

3. The apparatus according to claim 1, wherein said encoding parameter prediction unit predicts an encoding parameter controlling an encoding method for each image frame in encoding by the second encoding system.

4. The apparatus according to claim 1, wherein the second encoding system adaptively uses an intra-encoding mode and an inter-encoding mode, and wherein said encoding parameter prediction unit predicts an encoding parameter controlling the encoding mode in encoding by the second encoding system.

5. The apparatus according to claim 1, wherein said encoding parameter prediction unit predicts an encoding parameter controlling an encoding rate in encoding by the second encoding system.

6. The apparatus according to claim 1, wherein an image attribute detected by said encoding parameter prediction unit indicates an image complexity of a prescribed unit of the first encoded image data.

7. The apparatus according to claim 1, wherein an image attribute detected by said encoding parameter prediction unit indicates an amount of motion of a prescribed unit of the first encoded image data.

8. The apparatus according to claim 1, wherein an image attribute detected by said encoding parameter prediction unit indicates an amount of data of a prescribed unit in the first encoded image data.

9. The apparatus according to claim 1, wherein an image attribute detected by said encoding parameter prediction unit indicates a scene change position in the first encoded image data.

10. The apparatus according to claim 1, wherein an image attribute detected by said encoding parameter prediction unit indicates an image recording time in the first encoded image data.

11. The apparatus according to claim 1, wherein an image attribute detected by said encoding parameter prediction unit indicates an intensity distribution in the first encoded image data.

12. The apparatus according to claim 1, wherein an image attribute detected by said encoding parameter predication unit indicates a color distribution in an image frame in the first encoded image data.

13. The apparatus according to claim 1, wherein the first encoding system is a system having only intra-encoding, and the second encoding system is a system adaptively using an intra-encoding mode and an inter-encoding mode.

14. The apparatus according to claim 1, further comprising a recording unit, adapted to record the second encoded image data converted by the conversion unit onto a second recording medium.

15. A method for converting an encoding system, comprising:

a fast playback reading step, of discontinuously reading image data from a recording medium to effect fast playback;

a normal playback reading step, of continuously reading image data from a recording medium to effect normal playback;

analyzing intermittent image data of first encoded image data encoded by a first encoding system, which is discontinuously read from the recording medium in said fast playback reading step, and predicting an encoding parameter controlling an amount of data distribution for each image frame or each image block in encoding by a second encoding system different from the first encoding system; and converting the first encoded image data read out continuously from the recording medium in said normal playback reading step to second encoded image data by the second encoding system, based on the encoding parameter predicted, wherein said converting step includes decoding the first encoded image data read out continuously from the recording medium in said normal playback reading step, and encoding, based on the encoding parameter predicted in said encoding parameter predicting step, the first encoded image data decoded in said decoding step with the second encoding system, and outputting the second encoded image data, and wherein said encoding parameter predicting step includes detecting an attribute of an image from the first encoded image data read out in parts from the recording medium, and predicting an encoding parameter for encoding by the second encoding system, responsive to a detection result.

16. A program stored in a computer-readable medium for causing a computer to execute the steps of the method according to claim 15.

17. A computer-readable medium storing a program for causing a computer to execute the steps of the method according to claim 15.

18. An encoding system conversion apparatus comprising:

fast playback means for discontinuously reading image data from a recording medium to effect fast playback;

normal playback means for continuously reading image data from the recording medium to effect normal playback;

means for predicting an encoding parameter, which analyzes intermittent image data of first encoded image data encoded by a first encoding system, which is discontinuously read from the recording medium by said normal playback means, and which predicts an encoding parameter controlling an amount of data distribution for each image frame or each image block in encoding by a second encoding system that is different from the first encoding system; and means for converting image data, which converts the first encoded image data read out continuously from the recording medium by said normal playback means to second encoded image data by the second encoding system, based on the encoding parameter predicted by said means for predicting an encoding parameter, wherein said converting means includes means for decoding the first encoded image data read out continuously from the recording medium by said normal playback means, and means for encoding, based on the encoding parameter predicted by said encoding parameter predicting means, the first encoded image data decoded by said decoding means with the second encoding system, and outputting the second encoded image data, and wherein said encoding parameter predicting means detects an attribute of an image from the first encoded image data read out in parts from the recording medium, and predicts an encoding parameter for encoding by the second encoding system, responsive to a detection result.

19. An encoding system conversion apparatus comprising:

an encoding parameter prediction unit, adapted to analyze intermittent image data of first encoded image data encoded by a first encoding system that is discontinuously read from a recording medium, and predict an encoding parameter controlling an amount of data distribution for each image frame or each image block in encoding by a second encoding system that is different from the first encoding system; and a conversion unit, adapted to convert the first encoded image data read out continuously from the recording medium to a second encoded image data by the second encoding system, based on the encoding parameter predicted by said encoding parameter prediction unit, wherein an image attribute detected by said encoding parameter predication unit indicates a skin color distribution area in an image frame in the first encoded image data, and wherein said encoding parameter prediction unit predicts an encoding parameter controlling a code amount of the skin color distribution area in the image frame so as to increase in encoding by the second encoding system.

20. A method of converting an encoding system, comprising:

analyzing intermittent image data of first encoded image data encoded by a first encoding system that is discontinuously read from a recording medium, and predicting an encoding parameter controlling an amount of data distribution for each image frame or each image block in encoding by a second encoding system that is different from the first encoding system; and converting the first encoded image data read out continuously from the recording medium to a second encoded image data by the second encoding system, based on the encoding parameter predicted in said encoding parameter predicting step, wherein an image attribute detected in said encoding parameter predicating step indicates a skin color distribution area in an image frame in the first encoded image data, and wherein said encoding parameter predicting step includes predicting an encoding parameter controlling a code amount of the skin color distribution area in the image frame so as to increase in encoding by the second encoding system.

* * * * *